United States Patent
Hirokami et al.

(10) Patent No.: US 9,895,972 B2
(45) Date of Patent: Feb. 20, 2018

(54) WHEELIE SUPPRESSING DEVICE

(71) Applicant: Kawasaki Jukogyo Kabushiki Kaisha, Kobe-shi, Hyogo (JP)

(72) Inventors: Tatsuya Hirokami, Osaka (JP); Shohei Terai, Akashi (JP); Seiji Azuma, Kako-gun (JP); Kengo Ueda, Akashi (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 5 days.

(21) Appl. No.: 15/288,442

(22) Filed: Oct. 7, 2016

(65) Prior Publication Data
US 2017/0101009 A1    Apr. 13, 2017

(30) Foreign Application Priority Data
Oct. 7, 2015   (JP) ................. 2015-199421

(51) Int. Cl.
| | |
|---|---|
| *B60K 28/10* | (2006.01) |
| *F02D 41/00* | (2006.01) |
| *F02D 9/08* | (2006.01) |
| *F02D 37/02* | (2006.01) |
| *F02D 41/30* | (2006.01) |
| *F02P 5/145* | (2006.01) |
| *F02D 9/10* | (2006.01) |
| *F02D 41/02* | (2006.01) |
| *F02P 9/00* | (2006.01) |

(52) U.S. Cl.
CPC .............. *B60K 28/10* (2013.01); *F02D 9/08* (2013.01); *F02D 9/1095* (2013.01); *F02D 37/02* (2013.01); *F02D 41/0002* (2013.01); *F02D 41/0087* (2013.01); *F02D 41/021* (2013.01); *F02D 41/3005* (2013.01); *F02P 5/145* (2013.01); *F02P 9/002* (2013.01); *B60Y 2200/12* (2013.01); *B60Y 2400/301* (2013.01); *B60Y 2400/3032* (2013.01); *F02D 2200/50* (2013.01); *F02D 2250/26* (2013.01); *Y02T 10/42* (2013.01)

(58) Field of Classification Search
CPC .. F02D 41/00; F02D 41/0002; F02D 41/0087; F02D 41/30; F02D 41/3005; F02D 9/08; F02D 37/00; F02D 2200/50; F02D 2250/26; B60K 28/10; B60Y 2400/301; B60Y 2400/3032; Y02T 10/42
See application file for complete search history.

(56) References Cited

U.S. PATENT DOCUMENTS

2016/0144854 A1\* 5/2016 Watanabe ............. B60W 30/02
477/185

FOREIGN PATENT DOCUMENTS

| JP | 2010229912 A | | 10/2010 | |
| JP | 2011068253 A | \* | 4/2011 | ................ B60T 7/12 |
| JP | 2012144240 A | \* | 8/2012 | ............. B60T 8/1706 |

\* cited by examiner

*Primary Examiner* — Hieu T Vo
(74) *Attorney, Agent, or Firm* — Alleman Hall Creasman & Tuttle LLP

(57) ABSTRACT

A wheelie suppressing device comprises a wheelie determiner section which detects a wheelie state; and a wheelie suppressing section which performs a wheelie suppressing control for suppressing an engine output when the wheelie determiner section has detected the wheelie state, wherein the wheelie suppressing control includes a first suppressing control for suppressing the engine output while performing fuel feeding and an ignition operation, and a second suppressing control for suppressing the engine output by performing the fuel feeding or the ignition operation at a reduced rate.

9 Claims, 7 Drawing Sheets

WHEELIE SUPPRESSING DEVICE

CROSS-REFERENCE TO RELATED APPLICATION

This application claims priority to and the benefit of Japanese Patent Application No. 2015-199421 filed on Oct. 7, 2015, the entire disclosure of which is incorporated herein by reference.

BACKGROUND OF THE INVENTION

Field of the Invention

The present invention relates to a wheelie suppressing device which can suppress a wheelie occurring in a vehicle, by suppressing the output of a drive source.

Description of the Related Art

An engine output control device disclosed in JP2010-229912A is configured to reduce an engine output by increasing a retard amount of an ignition timing and an opening degree reduction amount of a throttle valve with an increase in a vehicle body pitch angle in a state in which a wheelie is occurring in a vehicle.

However, in an ignition retard control, an air-fuel mixture is combusted inside a cylinder. For this reason, it is difficult to increase the reduction amount of the engine output. In a throttle valve opening degree reduction control, it is difficult to quickly reduce the engine output due to the responsivity of the throttle valve. Under the circumstances, it sometimes takes time to sufficiently reduce the engine output after a wheelie state has been detected.

SUMMARY OF THE INVENTION

An object of the present invention is to quickly suppress a wheelie.

According to an aspect of the present invention, a wheelie suppressing device comprises a wheelie determiner section which detects a wheelie state; and a wheelie suppressing section which performs a wheelie suppressing control for suppressing an engine output when the wheelie determiner section has detected the wheelie state, wherein the wheelie suppressing control includes a first suppressing control for suppressing the engine output while performing fuel feeding and an ignition operation, and a second suppressing control for suppressing the engine output by performing the fuel feeding or the ignition operation at a reduced rate.

In the first suppressing control, an air-fuel mixture is combusted. Therefore, it is difficult to rapidly reduce the engine output. On the other hand, the amount of the engine output to be suppressed can be finely adjusted, and thus the driving feeling is not significantly degraded. In the second suppressing control, the rate of the combustion of the air-fuel mixture is reduced, and thus the engine output can be rapidly reduced. On the other hand, if the extent of the second suppressing control is increased, a state in which the combustion does not occur is transmitted to the rider, and the driving feeling is degraded. In accordance with the above-described configuration, since the first suppressing control and the second suppressing control are performed in parallel, it becomes possible to quickly suppress the wheelie and prevent degradation of the driving feeling.

At a time point which is close to a time point of start of the wheelie state, a degree of contribution to suppressing the engine output in the wheelie suppressing control may be higher in the second suppressing control than in the first suppressing control, and at a time point which is close to a time point of end of the wheelie state, the degree of contribution to suppressing the engine output in the wheelie suppressing control may be higher in the first suppressing control than in the second suppressing control.

The wheelie suppressing section may start the first suppressing control and the second suppressing control when the wheelie determiner section has detected the wheelie state, and terminate the second suppressing control at a time point earlier than a time point when the wheelie suppressing section terminates the first suppressing control.

In accordance with the above-described configuration, a response delay of the first suppressing control can be compensated by the second suppressing control, and the engine output can be suppressed by the second suppressing control at an earlier stage of the wheelie. Then, the second suppressing control is terminated. In this way, at a time point when the first suppressing control starts to effectively work to suppress the engine output, it becomes possible to prevent a situation in which the first suppressing control and the second suppressing control are performed at the same time and thereby the engine output is suppressed excessively. As a result, an impact transmitted to the rider can be mitigated.

An amount of the engine output to be suppressed by the second suppressing control may be changed in a stepwise manner, and the amount of the engine output to be suppressed by the first suppressing control is changed when the amount of the engine output to be suppressed by the second suppressing control is changed. In accordance with this configuration, in the second suppressing control, the amount of the engine output to be suppressed is changed in a stepwise manner. Therefore, when the amount of the engine output to be suppressed by the second suppressing control is changed, an impact may be transmitted to the rider. At this time, since the first suppressing control is performed, the engine output can be smoothly changed.

The wheelie suppressing section may increase an amount of the engine output to be suppressed, when a steering shaft vibration condition in which a speed of a front wheel is lower than a ground speed by a predetermined value or more is met. In accordance with this configuration, a vibration of a handle can be prevented when the front wheel is grounded on the ground surface.

The wheelie suppressing device may be used in a vehicle in which driving power is transmitted from an engine to a rear wheel via a transmission, and the wheelie suppressing section may adjust the amount of the engine output to be suppressed, based on a torque characteristic map of the engine, an engine speed, and a transmission ratio of the transmission. In accordance with this configuration, the amount of the engine output to be suppressed can be properly adjusted based on forward movement torque transmitted from the engine to the rear wheel.

The engine may include a plurality of cylinders, and the first suppressing control may be an intake-air amount control, and the second suppressing control may be an ignition reduction control. In accordance with this configuration, the engine output can be suppressed with a high responsivity by use of the ignition reduction control as the second suppressing control. The amount of the engine output to be suppressed can be finely adjusted by the intake-air amount control as the first suppressing control. By use of the intake-air amount control and the ignition reduction control, it becomes possible to realize the wheelie suppressing control which is capable of achieving the advantages of the second suppressing control and the first suppressing control, namely, quickly terminating the wheelie and keeping good driving feeling.

The first suppressing control may be an intake-air amount control performed by controlling an opening degree of an electronic throttle valve device. In accordance with this configuration, by controlling the opening degree of the electronic throttle valve device, the intake-air amount and hence the amount of the engine output to be suppressed can be finely adjusted, and good driving feeling can be kept during the wheelie suppressing control.

The electronic throttle valve device may include a main valve which is mechanically opened and closed in response to a throttle operation, and a sub-valve which is opened and closed in such a manner that an opening degree of the sub-valve is electronically controlled, and the wheelie suppressing control section may perform an ignition retard control concurrently with the intake-air amount control, as the first suppressing control. In accordance with this configuration, even in a case where the intake-air amount depends on the opening degree of the main valve and it is difficult to significantly suppress the engine output by electronic control of the sub-valve, the ignition retard control is performed as the first suppressing control, and thus the engine output can be suppressed to sufficiently suppress the wheelie. This makes it possible to avoid occurrence of an excess wheelie and terminate the wheelie at earlier time.

The above and further objects, features and advantages of the present invention will more fully be apparent from the following detailed description of preferred embodiment with reference to accompanying drawings.

DETAILED DESCRIPTION OF THE EMBODIMENTS

Hereinafter, the embodiments of the present invention will be described with reference to the drawings. The directions stated below are from the perspective of a rider riding in a vehicle. A forward and rearward direction corresponds with a vehicle length direction, while a rightward and leftward direction corresponds with a vehicle width direction.

Embodiment 1

Vehicle

Figure 1:
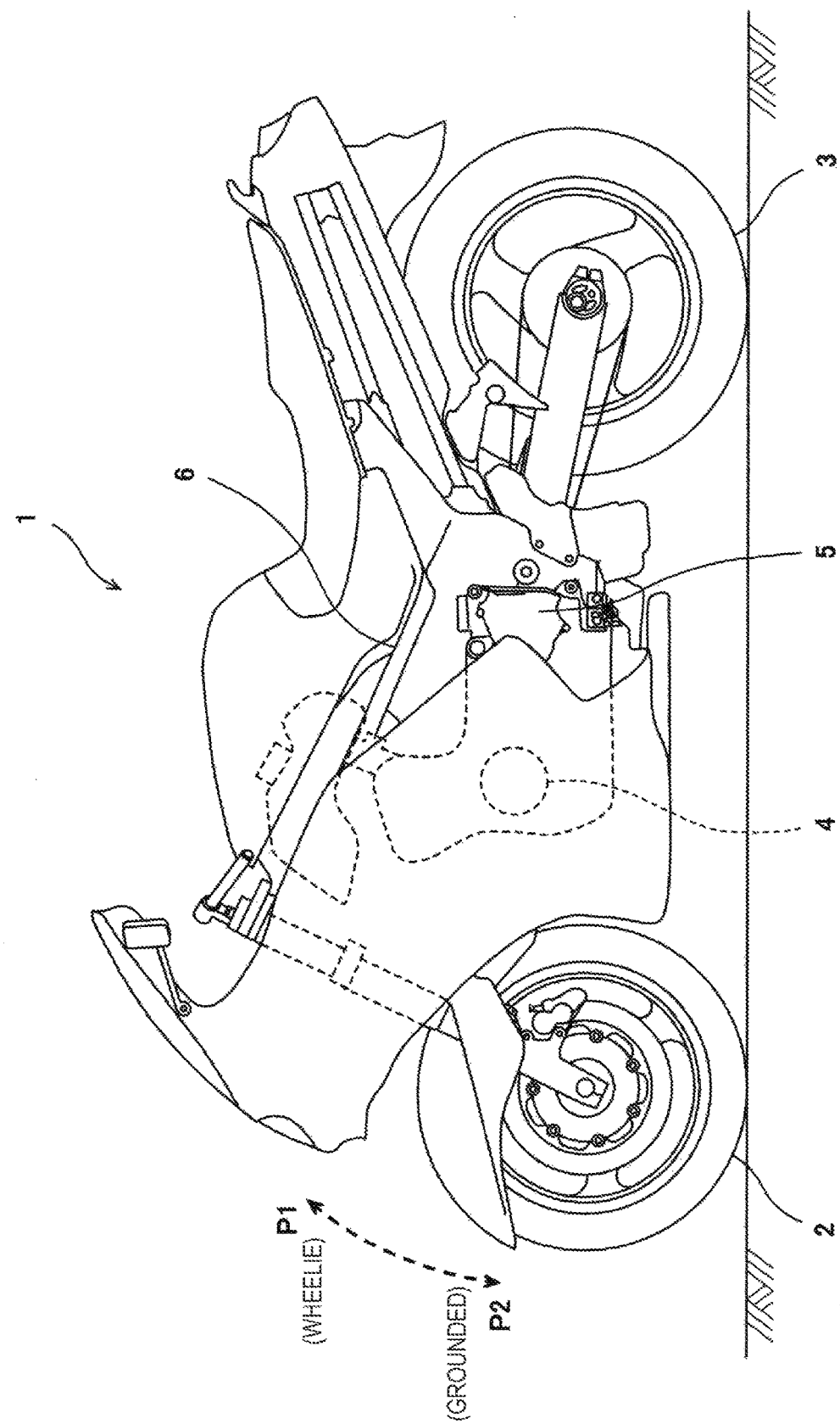
FIG. 1 is a left side view of a motorcycle which is an exemplary vehicle.
Figure 2:
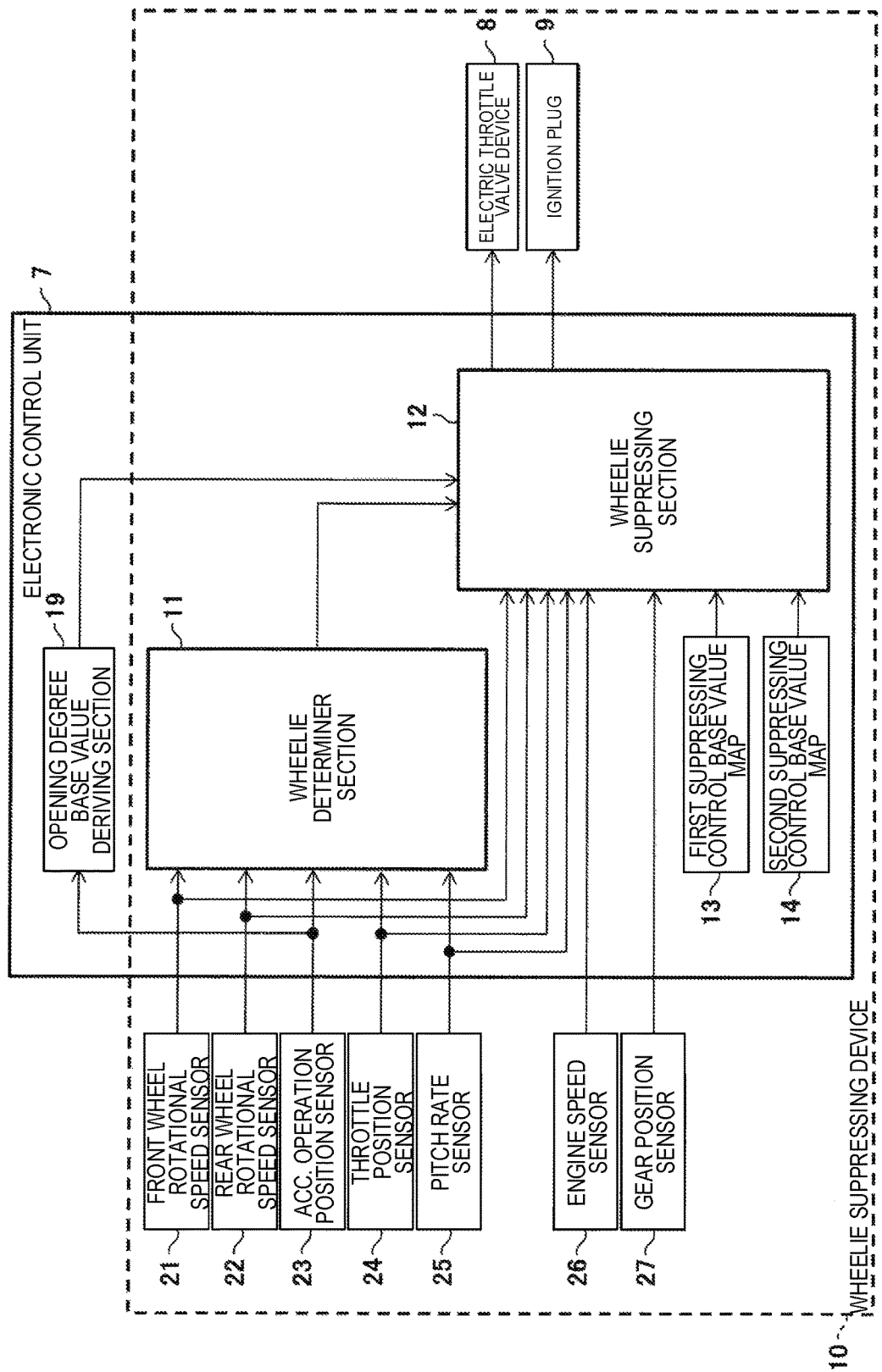
FIG. 2 is a block diagram showing a control system of the vehicle including a wheelie suppressing device according to Embodiment 1.

As shown in FIG. 1, a vehicle 1 includes a front wheel 2, a rear wheel 3, and an engine 4. Driving power generated by the engine 4 is transmitted to the rear wheel 3 via a driving power transmission mechanism 5. A motorcycle which is exemplarily shown as the vehicle 1 includes one front wheel 2 and one rear wheel 3. A wheel base between the front wheel 2 and the rear wheel 3 is small, and a power-to-weight ratio [W/g] is high. For this reason, a lift-off of the front wheel 2 from a ground surface, namely, a wheelie tends to occur in the motorcycle. Therefore, the motorcycle is a suitable example of the vehicle 1 including a wheelie suppressing control 10 (see FIG. 2).

While the engine output is great, and great driving power is transmitted from the engine 4 to the rear wheel 3 (drive wheel), the wheelie tends to occur. Therefore, while the wheelie is occurring in the vehicle 1, the rotational speed and rotational acceleration rate of the rear wheel 3, and the ground speed and ground acceleration rate of the vehicle body 6 are high. When the front wheel 2 lifts off the ground surface, the front wheel 2 rotates by inertia in a state in which the front wheel 2 is applied with an air resistance or a friction with an axle, and thereby the rotational speed and circumferential speed of the front wheel 2 are gradually reduced. For this reason, a difference between the circumferential speed of the front wheel 2 and the circumferential speed of the rear wheel 3 or the ground speed increases. While the front wheel 2 is lifting off the ground surface, the vehicle body 6 is angularly displaced in a clockwise direction in a left side view, around an imaginary rotational axis extending in the vehicle width direction and passing through a point on which the rear wheel 3 is grounded on the ground surface. On the other hand, while the front wheel 2 which is away from the ground surface is moving down toward the ground surface, the vehicle body 6 is angularly displaced in a counterclockwise direction in the left side view, around the imaginary rotational axis.

The "ground speed" refers to a movement speed [m/s] of the vehicle body 6 with respect to the ground surface. The "ground acceleration rate" refers to a movement acceleration rate [m/s$^2$] of the vehicle body 6 with respect to the ground surface. The "circumferential speed" refers to a speed of a rotating object at an arbitrary radial position and is indicated by $2\pi Rn$[m/s] (R is a radius [m] at the radial position, and n is the rotational speed [1/s] of the object). The circumferential speed of the wheel 2, 3 may be a speed on a wheel tread. Hereinafter, the rotation or angular displacement of the vehicle body 6 around the imaginary rotational axis extending in the vehicle width direction will be referred to as a "pitch", and the rotational angle of the vehicle body 6 around this rotational axis will be referred to as a "pitch angle."

The wheelie can be effectively suppressed by suppressing the engine output. Suppressing the engine output is also useful in a situation where a slip is occurring in the rear wheel 3 and the vehicle 1 has lost its traction function. In particular, continuation of the wheelie for a long time period is undesirable. This is because the rider cannot perform safe steering due to, for example, bounding of the front wheel 2 on the ground surface at the end of the wheelie. If the wheelie continues for a long time period, a difference between a front wheel speed and a rear wheel speed increases. Therefore, when the front wheel 2 is grounded on the ground surface, the speed of the front wheel 2 rapidly increases to follow the speed of the rear wheel 3, which makes it more difficult for the rider to perform the safe steering. For these reasons, in suppressing the wheelie, it is essential that the engine output be suppressed with a high responsivity and the rider's safe steering be secured.

(Wheelie Suppressing Device)

In light of the above-described traveling state at the occurrence of the wheelie, a wheelie determiner section 11 detects a wheelie state based on the speed of the vehicle body 6 and/or the wheel 2, 3, the engine output, and the pitch angle of the vehicle body 6.

The wheelie suppressing device 10 includes a front wheel rotational speed sensor 21 which detects the rotational speed of the front wheel 2, and a rear wheel rotational speed sensor 22 which detects the rotational speed of the rear wheel 3. Based on the detection values of these sensors 21, 22, the rotational speeds, rotational acceleration rates, circumferential speeds, and circumferential acceleration rates of the wheels 2, 3 can be easily obtained. In addition, from the circumferential speed and circumferential acceleration rate of the rear wheel 3, the ground speed and the ground acceleration rate can be estimated.

The wheelie suppressing device 10 may include an acceleration operation position sensor 23 which detects an operation position of the acceleration operation unit (e.g., an accelerator grip or an accelerator pedal) with which the rider inputs an acceleration request command, and a throttle valve position sensor 24 which detects the opening degree (namely, the rotational position of a valve element) of an electronic throttle valve device 8 actuated in response to an input operation performed by use of the acceleration operation unit. The operation position of the acceleration operation unit and the throttle valve opening degree highly correlate with the engine output. For this reason, instead of measuring the engine output itself, the wheelie state can be determined based on the operation position and/or the opening degree.

The wheelie suppressing device 10 may include a pitch rate sensor 25 which detects the pitch angular velocity of the vehicle body 6. The pitch rate sensor 25 is, for example, a rate gyro sensor. The wheelie determiner section 11 receives detection values as inputs from the pitch rate sensor 25 at specified sampling rates, and integrates the input detection values. In this way, the pitch angle of the vehicle body 6 can be easily obtained. Instead of the pitch rate sensor 25, the wheelie suppressing device 10 may include a pitch angle sensor (integration gyro sensor) which detects the pitch angle.

The wheelie determiner section 11 determines whether or not the vehicle 1 is in a "wheelie preceding state." When the wheelie determiner section 11 determines that the vehicle 1 is in the "wheelie preceding state", it starts to calculate a "wheelie amount." The wheelie determiner section 11 compares the wheelie amount to a wheelie threshold to determine whether or not the vehicle 1 is in a "wheelie state."

The "wheelie preceding state" is defined as a state in which the wheelie has started, a state in which the wheelie is about to start, or a state in which it is highly probable that the wheelie will occur anytime soon. The wheelie determiner section 11 determines whether or not a "speed/output condition" is met to determine whether or not the vehicle 1 is in the wheelie preceding state. The speed/output condition is a condition relating to the speed of the vehicle body 6 and/or the wheel 2, 3, and the engine output. For example, the speed/output condition includes a first condition, in which the difference (the difference is a value obtained by subtracting the circumferential speed of the front wheel 2 from the ground speed) between the ground speed and the circumferential speed of the front wheel 2 is equal to or larger than a first start threshold, a second condition in which the ground acceleration rate is equal to or higher than a second start threshold, a third condition in which the rotational acceleration rate of the front wheel 2 is lower than a third start threshold, and/or a fourth condition in which the output of the engine 4 is equal to or greater than a fourth start threshold. When all of the first to fourth conditions are met, the wheelie determiner section 11 may determine that the speed/output condition is met (the vehicle 1 is in the wheelie preceding state).

The "wheelie amount" is a parameter indicating the lift-off amount of the front wheel 2 with respect to the ground surface (to what extent the front wheel 2 is away from the ground surface), by a numeric value. The wheelie amount may be a change amount of the pitch angle of the vehicle body 6 after a time point when the speed/output condition has been met. At a time point when the speed/output condition is met, the vehicle 1 is in the wheelie preceding state, and the front wheel 2 is still in contact with the ground surface, or starts to lift off the ground surface with a little amount. For this reason, the change amount of the pitch angle of the vehicle body 6 after the time point when the speed/output condition has been met simply and quantitatively indicates the lift-off amount of the front wheel 2 with respect to the ground surface.

A specific calculation method of the wheelie amount is not particularly limited. For example, the wheelie amount is set to a predetermined reference value (e.g., zero) at a time point when the speed/output condition is met. After that, the wheelie determiner section 11 calculates the wheelie amount in such a manner that the detection values of the pitch rate sensor 25 input in succession after the time point when the speed/output condition has been met are integrated in succession, using the reference value as the initial value. From the calculated wheelie amount, the influences of the tilt of the vehicle body 6 due to factors (e.g., a change in the slope of the ground surface) other than the wheelie, which occurred before the wheelie determiner section 11 has determined that the vehicle 1 has been in the wheelie preceding state, can be excluded. This makes it possible to accurately and quantitatively estimate the lift-off amount indicating to what extent the front wheel 2 is away from the ground surface.

In the present embodiment, as described above and below, upon the detection of the wheelie state, the wheelie suppressing control starts. The "wheelie state" is defined as a state in which the front wheel 2 is away from the ground surface to an extent that the wheelie amount exceeds the wheelie threshold, and a wheelie which should be terminated soon by automatically suppressing the engine output is currently occurring in the vehicle 1. Since the wheelie determiner section 11 performs the determination process based on the wheelie amount quantitatively and accurately indicating to what extent the front wheel 2 is away from the ground surface, the wheelie state can be accurately detected.

The wheelie determiner section 11 determines whether or not the wheelie preceding state has terminated, after the time point when the speed/output condition was met. In a case where the wheelie determiner section 11 determines that the wheelie preceding state has terminated, it ceases the calculation of the wheelie amount and resumes the determination of whether or not the speed/output condition is met. The wheelie determiner section 11 determines whether or not the wheelie preceding state has terminated by, for example, determining whether or not a condition in which the wheelie amount is less than a predetermined first termination threshold is met, or determining whether or not a condition in which the pitch angular velocity is less than a predetermined second tilt termination threshold is met.

When the wheelie determiner section 11 detects the wheelie state before it determines that the wheelie preceding state has terminated, it determines whether or not the wheelie state has terminated. When the wheelie determiner section 11 determines that the wheelie state has terminated, it terminates the wheelie suppressing control being performed at that point of time, ceases to calculate the wheelie amount, and resumes the determination of whether or not the speed/output condition is met.

When the wheelie determiner section 11 detects the wheelie state, a wheelie suppressing section 12 performs a wheelie suppressing control for suppressing the engine output. The wheelie suppressing control includes a first suppressing control, and a second suppressing control. The engine 4 includes a plurality of cylinders. The first suppressing control and the second suppressing control are performed by controlling the engine output and the driving power generated by the engine 4.

In the first suppressing control, the engine output is suppressed while performing fuel feeding and an ignition operation. In other words, the output of the cylinder whose output is to be suppressed is suppressed while maintaining air-fuel mixture combustion in this cylinder. The first suppressing control includes, for example, an ignition retard control and an intake-air amount control (throttle valve opening degree reduction control).

In the first suppressing control, the air-fuel mixture is combusted in all of the cylinders. For this reason, it is difficult to rapidly reduce the engine output. In the intake-air amount control, even when a command for suppressing the engine output is provided to the electronic throttle valve device 8, it takes some time for the rotational position of the valve element to reach a statically determinate value. In this respect, it is difficult to rapidly reduce the engine output in the first suppressing control. In other words, since the engine output is gradually reduced, an impact is less likely to be transmitted to the rider. Since each of the throttle valve opening degree and the ignition timing has continuity, the first suppressing control is suited for fine adjustment of the engine output although the command value is a digital amount. Therefore, the first suppressing control is capable of suppressing the engine output without significantly degrading the rider's driving feeling.

In the second suppressing control, the engine output is suppressed by performing the fuel feeding or the ignition operation at a reduced rate. In other words, the combustion of the air-fuel mixture in the cylinder whose output is to be suppressed does not occur, to suppress the output of this cylinder. The second suppressing control includes, for example, an ignition reduction control and a fuel reduction control.

In the second suppressing control, since the combustion of the air-fuel mixture in part of the cylinders does not occur, the engine output can be rapidly reduced. If the extent of the second suppressing control is increased by, for example, increasing a reduction rate, the rider easily becomes aware that the combustion of the air-fuel mixture is not currently performed by a sense of a force or a sense of hearing, which makes the rider's driving feeling worse. The numeric value of the reduction rate has relatively high discreteness. Therefore, the amount of the engine output to be suppressed is unavoidably changed in a stepwise manner when the extent of the second suppressing control (reduction rate) is changed. Therefore, a change in the extent of the second suppressing control may be transmitted to the rider as an impact.

The wheelie suppressing device 10 uses the first suppressing control and the second suppressing control in parallel, to realize that the wheelie can be quickly suppressed and good driving feeling can be kept. In this case, the shortcomings of one of the first suppressing control and the second suppressing control can be covered by the advantages of the other. Hereinafter, a case where the intake-air amount control is performed as the first suppressing control and the ignition reduction control is performed as the second suppressing control will be exemplarily described.

Figure 5:
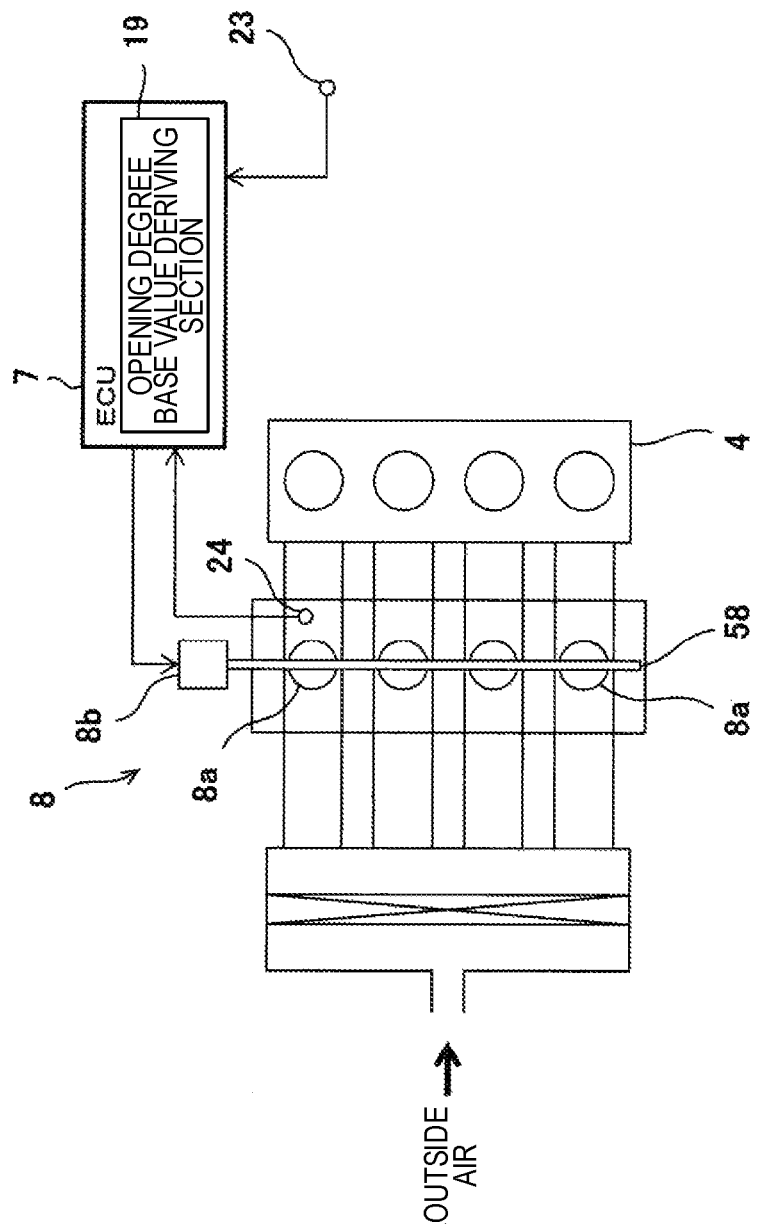
FIG. 5 is a view showing an engine air-intake system according to Embodiment 1.

To realize the intake-air amount control, the electronic throttle valve device 8 is required to be electronically controlled by the ECU 7. As shown in FIG. 5, the electronic throttle valve device 8 includes valve elements 8a which are rotatable within an air-intake passage, and a valve actuator 8b (e.g., electric motor) which rotates the valve elements 8a. The electronic throttle valve device 8 of the present embodiment does not include a valve element which is mechanically coupled via a wire or the like to the acceleration operation unit which can be operated by the rider, and is configured to be mechanically opened and closed in response to the throttle operation of the acceleration operation unit. An opening degree base value deriving section 19 within the ECU 7 derives a base value of the throttle valve opening degree based on the operation position of the acceleration operation unit which is input from the acceleration operation position sensor 23. The ECU 7 derives a target value of the throttle valve opening degree based on the derived base value, and drives the valve actuator 8b so that the throttle valve opening degree reaches the target value. The ECU 7 decides the target value in such a manner that it compensates the base value using information other than the detection value of the acceleration operation position sensor 23, and thereby controls the intake-air amount and hence the engine output based on this information.

In the intake-air amount control which is an example of the first suppressing control, an opening degree reduction amount of the base value of the throttle valve opening degree which is derived by the opening degree base value deriving section 19 can be assumed as the amount of the engine output to be suppressed. By compensating the base value with the opening degree reduction amount, the ECU 7 decides the target value of the opening degree of the electronic throttle valve device 8.

The amount of the engine output to be suppressed increases as the opening degree reduction amount increases. The opening degree reduction amount may be decided by a compensation coefficient which is less than 1, by which the base value is to be multiplied. In that case, the amount of the engine output to be suppressed increases as the compensation coefficient is smaller and is closer to zero (the opening degree reduction amount corresponds to a value obtained by multiplying by the base value a subtraction value obtained by subtracting the compensation coefficient from 1).

The wheelie suppressing section 12 decides the opening degree reduction amount based on the pitch angular velocity, the pitch angle, a transmission ratio, an engine speed, the difference between the front wheel speed and the rear wheel speed, and time (hereinafter this time will be referred to as "wheelie time") that passes from a time point when the wheelie determiner section 11 has detected the wheelie state. The wheelie suppressing section 12 decides the opening degree reduction amount by, for example, compensating the base value based on the pitch angular velocity and the pitch angle, by use of the compensation value based on the engine speed, the difference between the front wheel speed and the rear wheel speed, and the wheelie time. The base value is decided as a value made different between transmission ratios. Or, the base value is compensated based on the transmission ratio.

In the ignition reduction control which is an example of the second suppressing control, the ignition reduction rate can be assumed as the amount of the engine output to be suppressed. With an increase in the ignition reduction rate, the amount of the engine output to be suppressed increases. The ignition reduction rate is defined as a ratio of the number of times spark generation performed by the ignition plug 9 does not occur, with respect to the number of expansion strokes which occur in succession. In a case where the ignition reduction rate is "1/9", the ignition is not performed once in 9 successive expansion strokes. In the expansion stroke in which the ignition is not performed, an operation command is not output to the ignition plug 9 (instead, in the remaining 8 expansion strokes, the operation command is output to the ignition plug 9, and the air-fuel mixture is combusted).

The intake-air amount control as the first suppressing control allows the combustion in the engine to be continued while maintaining a state in which an air-fuel ratio is close to a target air-fuel ratio. In addition, the intake-air amount control can mitigate an impact generated due to a change in the engine output more than the ignition retard control can. The ignition reduction control as the second suppressing control can obtain a higher responsivity than, for example, the fuel reduction control as the second suppressing control can, because an ignition state can be easily electrically controlled.

The wheelie suppressing device 10 (ECU 7) contains therein a base value map 13 used to decide the base value of the opening degree reduction amount, and a base value map 14 used to decide the base value of the ignition reduction rate. With reference to the base value map 13 of FIG. 3A and the base value map 14 of FIG. 3B, the base value is larger as the pitch angular velocity is positive and higher, and the wheelie amount is larger. It should be noted that the base value of the ignition reduction rate is set to zero, when the pitch angular velocity is negative (unless the wheelie amount is not excessively large). In contrast, the base value of the opening degree reduction amount exceeds zero irrespective of whether the pitch angular velocity is positive or negative.

The base value of the ignition reduction rate is set for each of a plurality of ranges defined in a two-dimensional coordinate system of the pitch angular velocity and the wheelie amount. The ignition reduction rate is discrete, and therefore the base value of the ignition reduction rate changes in a stepwise manner as the range changes according to a change in the pitch angular velocity and a change in the wheelie amount. In the present embodiment, the base value of the opening degree reduction amount changes as in the case of the base value of the ignition reduction rate.

Regarding the parallel use of the first suppressing control and the second suppressing control, at a time point that is close to a time point of the start of the wheelie, a degree of contribution to suppressing the engine output achieved by the wheelie suppressing control is higher in the second suppressing control than in the first suppressing control. At a time point that is close to a time point of the end of the wheelie state, the degree of the contribution is higher in the first suppressing control than in the second suppressing control. In other words, for a time period from the start of the wheelie state to the end of the wheelie state, the major role in suppressing the engine output shifts from the second suppressing control to the first suppressing control.

Figure 3A:
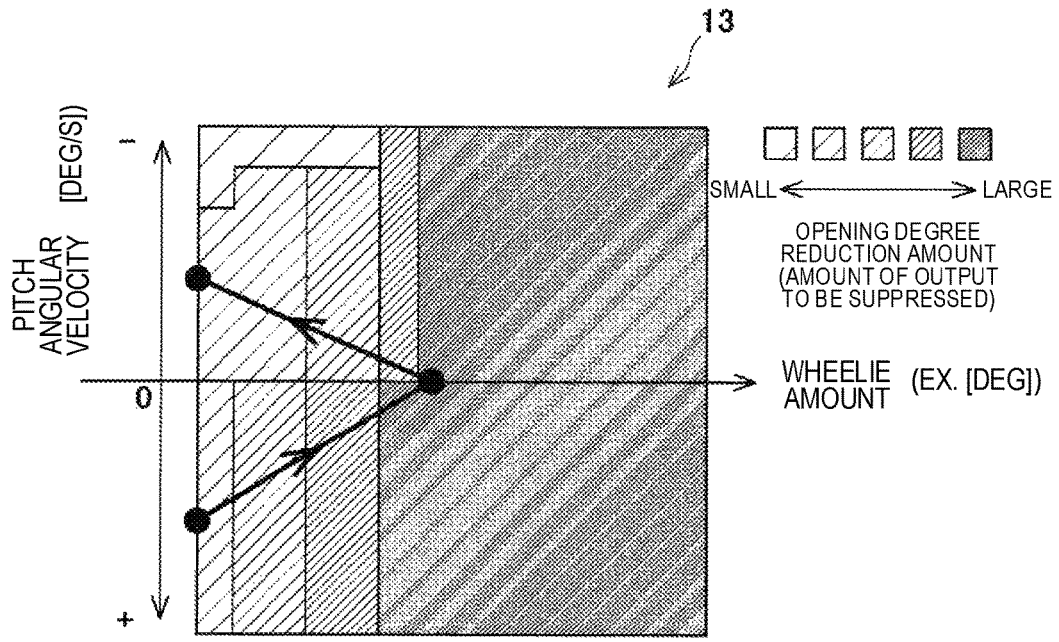
FIG. 3A shows a base value map for deriving a base value of an opening degree reduction amount of an intake-air amount control which is an example of a first suppressing control.
Figure 3B:
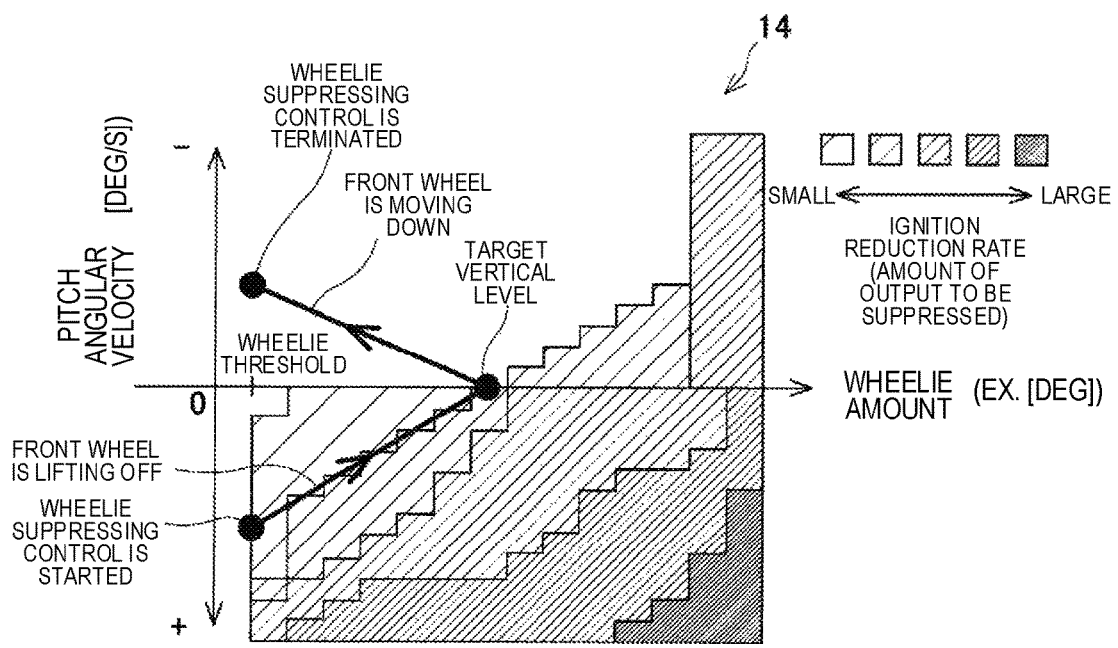
FIG. 3B shows a base value map for deriving a base value of an ignition reduction rate of an ignition reduction control which is an example of a second suppressing control.

Regarding this respect, FIGS. 3A and 3B schematically show an example of a change in the pitch angular velocity and a change in the wheelie amount from a time point when the wheelie determiner section 11 detected the wheelie state to a time point when it determines that the wheelie state has terminated in such a manner that these changes are superposed on the base value maps 13, 14. At the time point when the wheelie determiner section 11 detects the wheelie state, the wheelie amount is the wheelie threshold. Since the front wheel 2 starts to lift off the ground surface, the pitch angular velocity takes a certain positive value. With an increase in the wheelie amount from a time point when the pitch angular velocity takes the certain positive value, the pitch angular velocity is reduced by suppressing the engine output. When the front wheel 2 reaches a target (desired) vertical level by suppressing the engine output, the pitch angular velocity becomes zero. After that (while the front wheel 2 is moving down toward the ground surface), the pitch angular velocity is gradually reduced from zero (absolute value is gradually increased), and the wheelie amount is reduced. When the wheelie amount reaches the termination threshold and the wheelie determiner section 11 determines that the wheelie has terminated, the wheelie suppressing section 12 terminates the wheelie suppressing control.

The base value of the ignition reduction rate exceeds zero from the time point when the wheelie determiner section 11 has detected the wheelie state until a time point when the front wheel 2 reaches the target vertical level by suppressing the engine output. The base value of the ignition reduction rate is set to zero while the front wheel 2 is moving down toward the ground surface. Specifically, a basic control content in which the use of the compensation value which will be described later is not considered is such that the ignition reduction control which is an example of the second suppressing control is performed for a time period from the time point when the wheelie determiner section 11 has detected the wheelie state until the time point when the front wheel 2 reaches the target vertical level by suppressing the engine output and is terminated while the front wheel 2 is moving down toward the ground surface.

In contrast, the base value of the opening degree reduction amount exceeds zero throughout a time period from the time point when the wheelie determiner section 11 detected the wheelie state until it determines that the wheelie state has terminated. Specifically, a basic control content is such that the intake-air amount control which is an example of the first suppressing control is performed throughout a time period for which the wheelie determiner section 11 determines that the vehicle 1 is in the wheelie state.

As described above, the two suppressing controls are initiated at the time point when the wheelie determiner section 11 has detected the wheelie state. However, the second suppressing control is terminated when some time passes thereafter. In the present example, at the time point when the pitch angular velocity is reduced to zero and the front wheel 2 reaches the target vertical level by suppressing the engine output, the second suppressing control is terminated. As described above, the first suppressing control is incapable of rapidly suppressing the engine output. For this reason, at a time point that is close to a time point of the start of the wheelie state, a degree of contribution to suppressing the engine output achieved by the wheelie suppressing control is higher in the second suppressing control than in the first suppressing control. Since the responsivity of the second suppressing is high, the engine output can be suitably suppressed at an initial stage of the wheelie. The second suppressing control is performed for a time period that passes until the first suppressing control reaches a stabilized state. At a time point when the first suppressing control is stabilized and becomes capable of effectively suppressing the engine output, the second suppressing control is terminated. At a time point which is close to a time point of the end of the wheelie state, the degree of contribution to suppressing the engine output achieved by the wheelie suppressing control is higher in the first suppressing control than in the second suppressing control.

Just after the detection of the wheelie state, the second suppressing control can suppress the engine output with a higher responsivity. This makes it possible to avoid occurrence of an excess wheelie and terminate the wheelie state at earlier time. After the first suppressing control has begun to work effectively to suppress the engine output, the engine output can be gently suppressed, and good driving feeling can be kept. In the parallel use of the first suppressing control and the second suppressing control, the timings at which these suppressing controls are initiated, terminated, and performed, are set in view of the characteristics of these suppressing controls. Therefore, it becomes possible to terminate the wheelie state at earlier time and keep good driving feeling. In addition, at the time point when the first suppressing control has begun to work effectively to suppress the engine output, it becomes possible to avoid a situation in which the two suppressing controls are performed at the same time and the engine output is significantly suppressed. Therefore, an impact transmitted to the rider can be mitigated.

In a case where an unexpected wheelie occurs, the rider tends to spontaneously operate the acceleration operation unit to decelerate the vehicle 1 to terminate this wheelie. The intake-air amount control can reduce the intake-air amount more, by adding the opening degree reduction amount to the reduced base value. As should be appreciated, the intake-air amount control works with the rider's operation performed to decelerate the vehicle 1, and thus the engine output can be suppressed more effectively. In this way, the intake-air amount complies with the rider's typical operation. Therefore, the engine output can be suppressed according to the rider's driving feeling. When the front wheel 2 is grounded on the ground surface, the rider is forced to keep a state in which the vehicle body 6 stands on the ground surface while suppressing a vibration of the handle. Since the engine output is suppressed according to the rider's driving feeling at the final stage of the wheelie, the vehicle 1 can travel smoothly after the front wheel 2 is grounded on the ground surface. In addition, since the amount of the engine output to be suppressed can be finely adjusted toward the end of the wheelie suppressing control, a great impact is not transmitted to the rider when the wheelie suppressing control being performed is ceased.

If the difference between the rotational speed of the front wheel 2 and the rotational speed of the rear wheel 3 is great, the rotational speed of the front wheel 2 rapidly increases to follow the rotational speed of the rear wheel 3 just after the front wheel 2 has been grounded on the ground surface, which increases a vibration of the handle (vibration of a steering shaft). With an increase in the wheelie time, the difference between the rotational speed of the front wheel 2 and the rotational speed of the rear wheel 3 increases. Each of the base value of the opening degree reduction amount and the base value of the ignition reduction rate may be compensated by a compensation value based on the difference between the front wheel speed and the rear wheel speed, when this difference exceeds a predetermined value. Each of the base value of the opening degree reduction amount and the base value of the ignition reduction rate may be compensated by a compensation value based on the wheelie time, when the wheelie time exceeds a predetermined value. This makes possible to increase the amount of the engine output to be suppressed by the air-intake-air amount control and the amount of the engine output to be suppressed by the ignition reduction control.

In accordance with this compensation (increasing the amount of the engine output to be suppressed), a possibility of an increasing vibration of the handle is detected in advance, and the amount of the engine output to be suppressed is increased. Therefore, an increase in the difference between the front wheel speed and the rear wheel speed can be suppressed, and the vehicle 1 can travel smoothly after the front wheel 2 is grounded on the ground surface. The condition in which "the difference between the front wheel speed and the rear wheel speed exceeds the predetermined value" and the condition in which "the wheelie time exceeds the predetermined time" are examples of the condition (steering shaft vibration condition) used to determine whether or not a significant vibration will occur in the handle. Further, the wheelie suppressing section may determine whether or not another example of the steering shaft vibration condition, namely, a condition in which the rotational speed of the front wheel 2 is lower than a predetermined value, is met. By compensating the base value to increase the amount of the engine output to be suppressed when this condition is met, the same effects can be obtained.

Each of the base value of the opening degree reduction amount and the base value of the ignition reduction rate may be compensated based on the engine speed and a transmission ratio. The "transmission ratio" is defined as a speed ratio (the engine output is a denominator) decided based on a gear position of a transmission included in the driving power transmission mechanism 5. To realize this compensation, the wheelie suppressing device 10 may include an engine speed sensor 26 which detects an engine speed, and a gear position sensor 27 which detects the gear position of the transmission. By performing this compensation, the amount of the engine output to be suppressed can be properly adjusted based on forward movement torque transmitted to the rear wheel 3, and thus the wheelie can be suppressed. For example, as the engine speed is higher, in a case where the engine rotational speed exceeds a predetermined value, the compensation value and hence the amount of the engine output to be suppressed may be increased. As the transmission ratio is higher (the gear position is lower), the compensation value and hence the amount of the engine output to be suppressed may be increased. It is desirable that a relation between the engine speed and the compensation value and a relation between the transmission ratio and the compensation value be decided in view of the torque characteristic of the engine 4. This makes it possible to more properly adjust the amount of the engine output to be suppressed, based on the forward movement torque. To this end, the wheelie suppressing device 10 may contain therein a torque characteristic map defining the engine torque characteristic.

Hereinafter, the base value maps 13, 14 will be further described. In each of the base value maps 13, 14, as the pitch angular velocity is higher, the base value and hence the amount of the engine output to be suppressed are set to be larger, while as the wheelie amount is larger, the base value and hence the amount of the engine output to be suppressed are set to be larger. The amount of the engine output to be suppressed is set based on the pitch angular velocity and the wheelie amount. Therefore, in a case where the pitch angular velocity is high and the wheelie amount is small, the engine output can be suppressed before the wheelie amount increases. Also, in a case where the pitch angular velocity is low and the wheelie amount is large, the engine output can be suppressed. The engine output can be suppressed in a situation in which the wheelie amount is gradually increased.

If the pitch angular velocity is a negative value and an excessively large value, in the first suppressing control, the amount of the engine output to be suppressed is reduced. This makes it possible to reduce the extent to which the engine output is suppressed when the pitch angular velocity (the absolute value of the pitch angular velocity) increases just before the front wheel 2 is grounded on the ground surface. This allows the vehicle 1 to smoothly begin to travel after the front wheel 2 is grounded.

The maps 13, 14 are set for the first suppressing control and the second suppressing control, respectively. The extent of the second suppressing control for suppressing the amount of the engine output based on the pitch angular velocity may be set to be larger than that based on the wheelie amount. The engine output can be easily suppressed before the wheelie amount increases. Hereinafter, a combination of one map 13 for the first suppressing control (first suppressing control map 13) and one map 14 for the second suppressing control (second suppressing control map 14) which are selected under the same driving conditions will be referred to as a "map set".

Figure 4A:
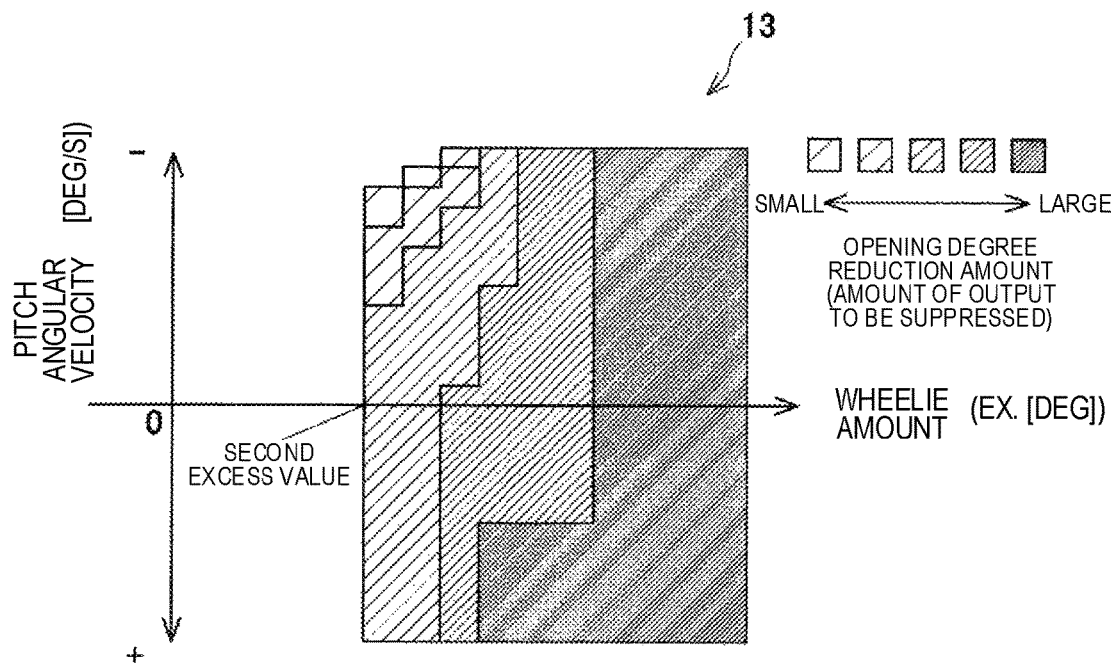
FIGS. 4A and 4B show an example of a map set different from a map set of FIGS. 3A and 3B.
Figure 4B:
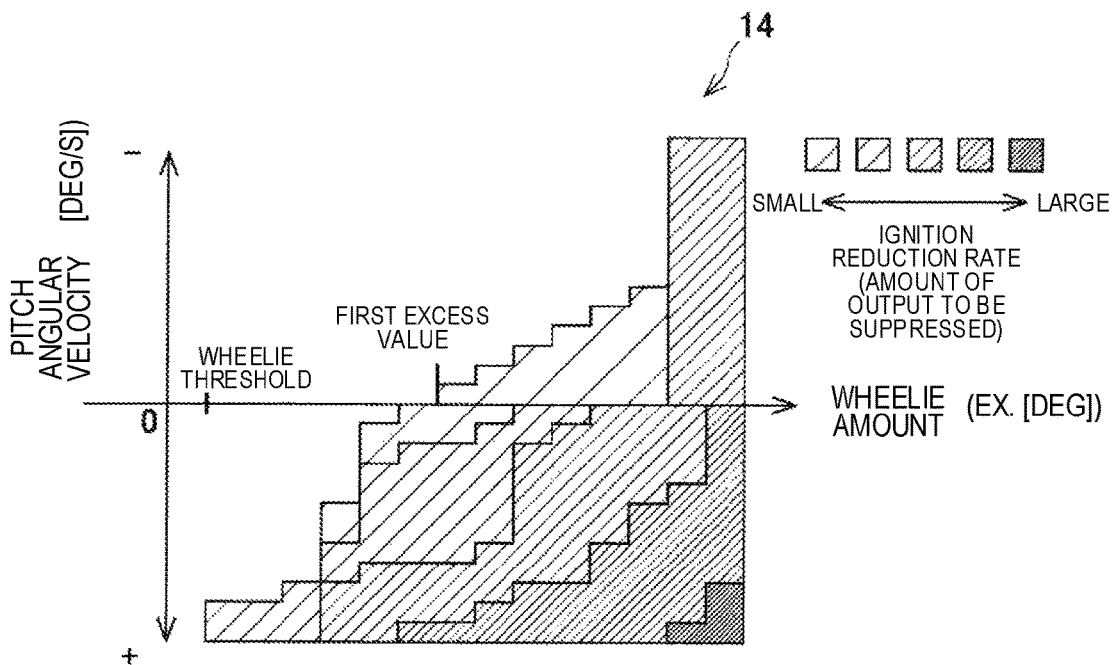

FIGS. 4A and 4B show an example of the map set different from the map set of FIGS. 3A and 3B. In the map set of FIGS. 4A and 4B, a range in which the engine output is to be suppressed is narrowed, compared to the map set of FIGS. 3A and 3B. In the example of FIGS. 4A and 4B, the engine output is not suppressed when the wheelie amount is small. In other words, a wheelie is permitted to some extent, and in this situation, the control for suppressing the engine output is not initiated. The wheelie suppressing device 10 may include a map selection operation unit (not shown) which can be operated by the rider to input a command. The rider can select the map set adapted to the rider's driving skill, a traveling scene, or the like and input a command to select the set map. For example, the map set of FIGS. 3A and 3B is intended for a beginner and is used to promptly start to suppress the engine output in a case where it is highly probable that the wheelie is about to occur. In contrast, the map set of FIGS. 4A and 4B is intended for an experienced rider and is used to start to suppress the wheelie at a time point when the wheelie amount has become large.

It should be noted that the map set for the beginner and the map set for the experienced rider have the same trend as a whole, although there is a difference between these maps in that the range in which the engine is to be suppressed is narrow or wide. As can be seen from the map set of FIGS. 4A and 4B, compared to the first suppressing control, the second suppressing control starts to be suppress the engine output in a state in which the pitch angular velocity is a positive value and the wheelie amount is smaller (namely, at a stage in which the front wheel 2 is closer to the ground surface while the wheelie amount is increasing).

With reference to FIGS. 4A and 4B, the second suppressing control does not start to suppress the engine output, unless the wheelie amount exceeds a first predetermined excess value and the pitch angular velocity becomes equal to or larger than zero. The first excess value corresponds to the above-described target vertical level of the front wheel 2. When the wheelie amount exceeds the first excess value, the second suppressing control works to suppress the engine output even in a state in which the pitch angular velocity is a negative value. In this way, the excess wheelie can be terminated at earlier time. The first suppressing control does not start to suppress the engine output irrespective of the pitch angular velocity unless the wheelie amount exceeds a second excess value set to be smaller than the first excess value.

To derive the base value made different according to the transmission ratio, the ECU 7 contains therein a plurality of map sets which are set to correspond to transmission ratios, respectively. As described above, in a case where the plurality of map sets are stored to correspond to the driving skills or the like, the plurality of map sets corresponding to the transmission ratios, respectively, are stored to correspond to the plurality of map sets corresponding to the driving skills, respectively. In a case where n map sets corresponding to the driving skills, respectively, and m map sets corresponding to the transmission ratios, respectively, are prepared, (n×m) map sets are stored in the ECU 7.

In this case, as the transmission ratio is higher (the gear position is lower) and a reduction gear ratio is higher, a threshold at which suppressing the engine output is started is set to be smaller, even under the same pitch angular velocity and the same wheelie amount (further, under the same driving skill map set). As the reduction gear ratio is higher, the driving power to be transmitted to the rear wheel 3 (drive wheel) is greater even under the same engine output. Therefore, by setting the threshold in the above-described manner, the wheelie can be suitably suppressed even when the reduction gear ratio is high. In other words, in a situation in which the gear position is high and a probability with which the wheelie will occur is low, the extent to which the engine output is to be suppressed is reduced. As a result, the driving feeling is improved.

Hereinafter, the determination of the wheelie will be further described. As described above, the amount of the engine output to be suppressed is decided using the wheelie amount. This makes it possible to suppress the engine output depending on the extent of the wheelie. At a preceding stage of the determination of the wheelie, the wheelie amount is used to determine whether or not the vehicle 1 is in the wheelie state (in other words, whether or not to suppress the engine output).

The wheelie determiner section 11 includes a wheelie preceding state determiner section which makes a comparison between the vehicle body speed (ground speed) with respect to the ground surface and the circumferential speed of the front wheel 2 (corresponding to the above-described first condition), to determine whether or not the vehicle is in the wheelie preceding state, and a wheelie state determiner section which calculates as the wheelie amount which is the lift-off amount of the front wheel 2 with respect to the ground surface, a change amount of the angle of the vehicle body 6 in the rotational direction (in a clockwise direction in the left side view) in which the front wheel 2 is away from the road surface, from a time point when the wheelie preceding state determiner section has determined that the vehicle has been in the wheelie preceding state. The change amount of the angle of the vehicle body 6 from the time point when the wheelie preceding state determiner section has determined that the vehicle has been in the wheelie preceding state, is calculated as the lift-off amount (wheelie amount) of the vehicle body 6 with respect to the ground surface. Therefore, the influences of the tilt of the vehicle body 6 which occurred before the wheelie preceding state determiner section has determined that the vehicle has been in the wheelie preceding state can be excluded, and thereby the lift-off amount indicating to what extent the front wheel 2 is away from the ground surface can be accurately and quantitatively estimated.

The wheelie preceding state determiner section may estimate the vehicle body speed with respect to the ground surface based on the circumferential speed of the rear wheel 3. The wheelie preceding state determiner section may determine whether or not the vehicle 1 is in the wheelie preceding state based on the vehicle body acceleration rate (ground acceleration rate) with respect to the ground surface (corresponding to the above-described second condition). The rear wheel 3 is driven by the driving power supplied from a drive source (engine 4), and the wheelie preceding state determiner section may determine whether or not the vehicle 1 is in the wheelie preceding state based on the output of the drive source (corresponding to the above-described fourth condition). The wheelie preceding state determiner section may determine whether or not the vehicle 1 is in the wheelie preceding state by making a comparison between a difference between the vehicle body speed with respect to the ground surface and the circumferential speed of the front wheel 2 and a threshold set for each of the vehicle body speeds (corresponding to the above-described third condition).

The wheelie state determiner section may determine whether or not the vehicle 1 is in the wheelie state based on the wheelie amount. The wheelie state determiner section may determine whether or not the wheelie state has terminated based on the rotational speed of the front wheel 2 and the wheelie amount.

As the first suppressing control, the ignition retard control performed by controlling the ignition plug 9 may be performed instead of or concurrently with the intake-air amount control (see Embodiment 2 which will be described below). Further, as the second suppressing control, the fuel reduction control performed by controlling the fuel injector may be performed instead of or concurrently with the ignition reduction control.

Embodiment 2

Figure 6:
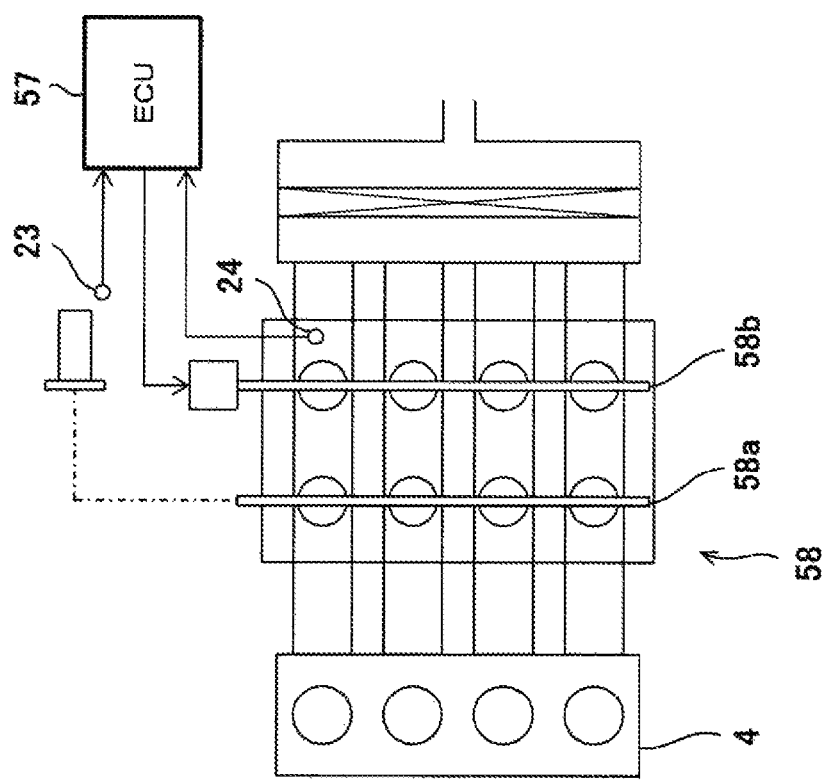
FIG. 6 is a view showing an engine air-intake system according to Embodiment 2.

FIG. 6 is a view showing an engine air-intake system according to Embodiment 2. As shown in FIG. 6, in Embodiment 2, an electronic throttle valve device 58 includes a main valve 58a and a sub-valve 58b provided together with the main valve 58a. Each of the main valve 58a and the sub-valve 58b includes valve elements which are rotatable within an air-intake passage. The valve elements of the main valve 58a and the valve elements of the sub-valve 58b are arranged in series within the air-intake passage. For example, the sub-valve 58b is disposed upstream of the main valve 58a in an intake-air flow direction. The main valve 58a is mechanically coupled via a wire to the acceleration operation unit which can be operated by the rider. The main valve 58a is opened and closed in response to the rider's throttle operation (operation of the acceleration operation unit). The sub-valve 58b is opened and closed in such a manner its opening degree is electronically controlled, as in the electronic throttle valve device 8 of Embodiment 1. The sub-valve 58b includes a valve actuator which rotates the valve elements.

In the present embodiment, also, the electronic throttle valve device 58 includes a valve mechanism whose opening degree can be electronically controlled. Therefore, the intake-air amount control can be used as the first suppressing control included in the wheelie suppressing control. In contrast, the amount of intake-air to be supplied to the engine 4 also depends on the opening degree of the main valve 58a operated by the rider. For this reason, the compensation for reducing the intake-air amount has a limitation and it is difficult to significantly suppress the engine output, compared to Embodiment 1.

Figure 7:
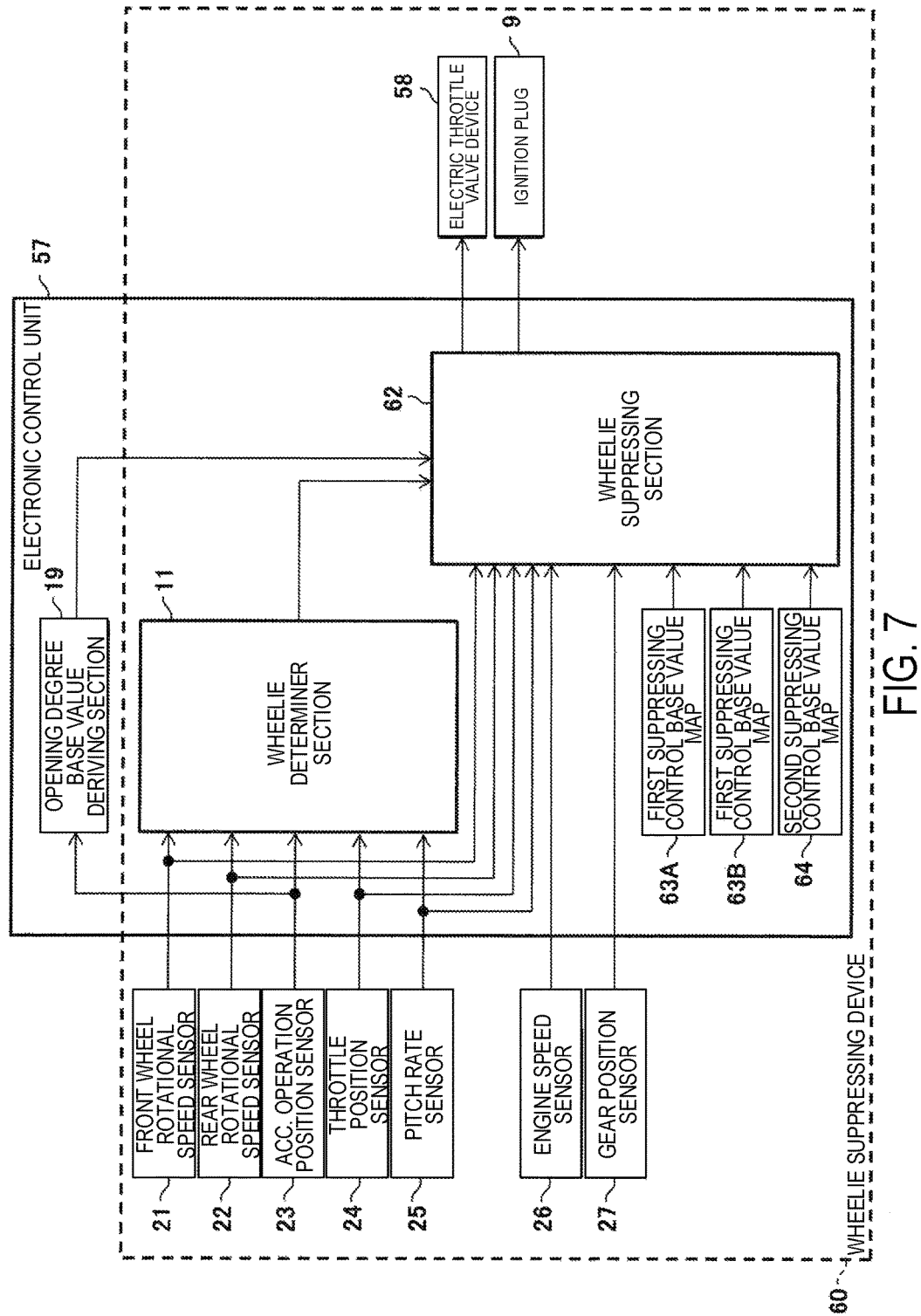
FIG. 7 is a block diagram showing a control system of the vehicle including a wheelie suppressing device according to Embodiment 2.

FIG. 7 is a block diagram showing a control system of the vehicle including a wheelie suppressing device 60 according to Embodiment 2. As the first suppressing control, a wheelie suppressing section 62 of the wheelie suppressing device 60 performs the ignition retard control performed by controlling the ignition plug 9, as well as the intake-air amount control performed by controlling the sub-valve 58b of the electronic throttle valve device 58. Therefore, as can be seen from a comparison with FIG. 2 of Embodiment 1, two maps 63A, 63B for the first suppressing control are provided. The map 63A is used in the intake-air amount control to derive the base value of the opening degree reduction amount, as in Embodiment 1. The map 63B is used in an ignition timing control to derive the base value of the ignition retard amount.

Since the ignition retard control is performed concurrently with the intake-air amount control, the engine output can be suppressed to sufficiently suppress the wheelie, even in the configuration of the air-intake system in which it is difficult to significantly suppress the engine output. This makes it possible to avoid occurrence of an excess wheelie and terminate the wheelie at earlier time, as in Embodiment 1.

The wheelie suppressing device of FIG. 7 is suitably used in the configuration of the air-intake system in which it is difficult to significantly suppress the engine output. Further, the wheelie suppressing device of FIG. 7 is suitably used in a vehicle including a drive system in which the engine output is great. For example, in a case where the vehicle includes a supercharger as an auxiliary machine of the engine, the engine output is great, and thereby a wheelie tends to occur. Correspondingly, the amount of the engine output to be suppressed to suppress the wheelie is increased. In view of this, in a case where the drive source is an engine with the supercharger, both of the intake-air amount control and the ignition retard control are performed as the first suppressing control. This makes it possible to avoid occurrence of an excess wheelie and terminate the wheelie at earlier time.

Other Embodiments

So far, the embodiments of the present invention have been described. The above-described configurations are merely exemplary, and may be added, deleted and changed within the scope of the invention.

Although in the above-described embodiments, the second suppressing control is terminated at a later stage of the wheelie as the basic control content, the second suppressing control may be performed throughout a time period for which the wheelie is occurring. In that case, if the ignition reduction rate is increased, the driving feeling is degraded. For this reason, increasing the ignition reduction rate has a limitation. When this limitation is reached and it is still necessary to suppress the engine output, the first suppressing control may be performed. This makes it possible to keep good driving feeling and terminate the wheelie at earlier time.

A numeric value of the ignition reduction rate is a fraction having a denominator which is an integer of about 10 and a numerator which is an integer less than 10. In the ignition reduction control, due to the discreteness of the ignition reduction rate, the amount of the engine output to be suppressed is unavoidably changed in a stepwise manner, which may provide an impact to the rider. To mitigate this, the amount of the engine output to be suppressed by the first suppressing control may be changed when the base value of the ignition reduction rate is shifted depending on a change in a traveling situation (e.g., the wheelie amount or the pitch angular velocity which decides the base value of the ignition reduction rate). For example, when the base value of the ignition reduction rate is reduced, the amount of the engine output to be suppressed by the first suppressing control may be increased at that point of time. In this configuration, the first suppressing control can lessen a rapid change in the amount of the engine output to be suppressed. As a result, the amount of the engine output to be suppressed can be smoothly changed in the whole of the wheelie suppressing control.

In a case where the ignition retard control is performed concurrently with the intake-air amount control as the first suppressing control, the degree of contribution to suppressing the engine output may be made different between the intake-air amount control and the ignition retard control depending on the wheelie state. For example, at an initial stage of the wheelie (when the front wheel starts to lift off the ground surface), the degree of contribution to suppressing the engine output may be made higher in the ignition retard control than in the intake-air amount control. The ignition retard control has a responsivity to a command which is higher than that of the intake-air amount control. Therefore, by increasing the degree of contribution to suppressing the engine output, in the ignition retard control, an increase in the wheelie amount can be suppressed. Then, at a time point when the front wheel 2 reaches a target vertical level, the degree of contribution to suppressing the engine output, in the intake-air amount control may be increased. When the wheelie amount exceeds a predetermined value (target vertical level), the ignition retard control may be performed in an auxiliary manner. Further, the second suppressing control (the ignition reduction control, the ignition cut control, the fuel reduction control, or the fuel cut control) may be used to suppress the engine output concurrently with the intake-air amount control and the ignition retard control. Then, while the front wheel 2 is moving down toward the ground surface, the degree of contribution to suppressing the engine output, in the intake-air amount control, may be increased, or the ignition retard control may be ceased.

Numerous improvements and alternative embodiment of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

The invention claimed is:

1. A wheelie suppressing device comprising:
    a wheelie determiner section which detects a wheelie state; and
    a wheelie suppressing section which performs a wheelie suppressing control for suppressing an engine output when the wheelie determiner section has detected the wheelie state,
    wherein the wheelie suppressing control includes a first suppressing control for suppressing the engine output while performing fuel feeding and an ignition operation, and a second suppressing control for suppressing the engine output by performing the fuel feeding or the ignition operation at a reduced rate.

2. The wheelie suppressing device according to claim 1, wherein at a time point which is close to a time point of start of the wheelie state, a degree of contribution to suppressing the engine output in the wheelie suppressing control is higher in the second suppressing control than in the first suppressing control, and
    wherein at a time point which is close to a time point of end of the wheelie state, the degree of contribution to suppressing the engine output in the wheelie suppressing control is higher in the first suppressing control than in the second suppressing control.

3. The wheelie suppressing device according to claim 1, wherein the wheelie suppressing section starts the first suppressing control and the second suppressing control when the wheelie determiner section has detected the wheelie state, and terminates the second suppressing control at a time point earlier than a time point when the wheelie suppressing section terminates the first suppressing control.

4. The wheelie suppressing device according to claim 1, wherein an amount of the engine output to be suppressed by the second suppressing control is changed in a stepwise manner, and the amount of the engine output to be suppressed by the first suppressing control is changed when the amount of the engine output to be suppressed by the second suppressing control is changed.

5. The wheelie suppressing device according to claim 1, wherein the wheelie suppressing section increases an amount of the engine output to be suppressed, when a steering shaft vibration condition in which a speed of a front wheel is lower than a ground speed by a predetermined value or more is met.

6. The wheelie suppressing device according to claim 1, wherein the wheelie suppressing device is used in a vehicle in which driving power is transmitted from an engine to a rear wheel via a transmission, and
    wherein the wheelie suppressing section adjusts an amount of the engine output to be suppressed, based on a torque characteristic map of the engine, an engine speed, and a transmission ratio of the transmission.

7. The wheelie suppressing device according to claim 1, wherein the engine includes a plurality of cylinders, and
    wherein the first suppressing control is an intake-air amount control, and the second suppressing control is an ignition reduction control.

8. The wheelie suppressing device according to claim 1, wherein the first suppressing control is an intake-air amount control performed by controlling an opening degree of an electronic throttle valve device.

9. The wheelie suppressing device according to claim 8, wherein the electronic throttle valve device includes a main valve which is mechanically opened and closed in response to a throttle operation, and a sub-valve which is opened and closed in such a manner that an opening degree of the sub-valve is electronically controlled, and
    wherein the wheelie suppressing control section performs an ignition retard control concurrently with the intake-air amount control, as the first suppressing control.

* * * * *